US 12,391,585 B2

(12) United States Patent
Sato et al.

(10) Patent No.: US 12,391,585 B2
(45) Date of Patent: Aug. 19, 2025

(54) SYSTEM AND METHOD FOR PERFORMING ELECTROCHEMICALLY-CYCLED OXIDATION ON LANDFILL LEACHATE

(71) Applicant: THE HONG KONG UNIVERSITY OF SCIENCE AND TECHNOLOGY, Kowloon (HK)

(72) Inventors: Yugo Sato, Kowloon (HK); Guanghao Chen, Kowloon (HK); Yuewei Liu, Kowloon (HK)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 367 days.

(21) Appl. No.: 18/195,243

(22) Filed: May 9, 2023

(65) Prior Publication Data
US 2023/0365441 A1 Nov. 16, 2023

Related U.S. Application Data

(60) Provisional application No. 63/340,409, filed on May 10, 2022.

(51) Int. Cl.
*C02F 1/467* (2023.01)
*C02F 1/32* (2023.01)
(Continued)

(52) U.S. Cl.
CPC ............ *C02F 1/4674* (2013.01); *C02F 1/325* (2013.01); *C02F 1/46109* (2013.01);
(Continued)

(58) Field of Classification Search
CPC .......... C02F 1/325; C02F 1/32; C02F 1/4674; C02F 1/4672; C02F 1/46109;
(Continued)

(56) References Cited

U.S. PATENT DOCUMENTS

2013/0327353 A1* 12/2013 Field .................... B08B 7/00
134/1

FOREIGN PATENT DOCUMENTS

CN 101734750 A 6/2010
CN 102219328 A 10/2011
(Continued)

OTHER PUBLICATIONS

Montanaro et al, "UV-assisted electrochemical degradation of coumarin on boron-doped diamond electrodes", Chemical Engineering Journal 323, pp. 512-519 (Year: 2017).*
(Continued)

*Primary Examiner* — Claire A Norris
(74) *Attorney, Agent, or Firm* — Nath, Goldberg & Meyer; Jerald L. Meyer

(57) ABSTRACT

A system and method for performing electrochemically-cycled oxidation on landfill leachate are provided for the removal of organic materials in landfill leachate which have an ultraviolet absorbance at 254 nm ($UVA_{254}$), thus pretreating the landfill leachate for co-treatment through dilution with municipal sewage. Electrochemical oxidation is performed on the landfill leachate in a first reactor chamber to produce hypochlorite ($OCl^-$), followed by delayed application of ultraviolet radiation to produce hydroxyl radicals ($OH^•$) and reactive chlorine species to break bonds in the organic materials. A portion of this partially-treated landfill leachate is then fed to a second reactor chamber for subsequent dichlorination through ultraviolet photolysis. An equivalent volume of fresh landfill leachate is fed into the first reactor chamber to begin the cycle again, allowing for continuous treatment of a source of landfill leachate.

20 Claims, 4 Drawing Sheets

(51) Int. Cl.
  *C02F 1/461* (2023.01)
  *C02F 103/06* (2006.01)

(52) U.S. Cl.
  CPC .............. *C02F 2001/46133* (2013.01); *C02F 2103/06* (2013.01); *C02F 2201/4614* (2013.01); *C02F 2201/4615* (2013.01); *C02F 2201/4617* (2013.01); *C02F 2303/185* (2013.01); *C02F 2305/023* (2013.01)

(58) Field of Classification Search
  CPC ........ C02F 2103/069; C02F 2201/4614; C02F 2201/4615; C02F 2201/4617; C02F 2303/185; C02F 2305/023
  USPC .................................................... 210/748.13
  See application file for complete search history.

(56) References Cited

FOREIGN PATENT DOCUMENTS

| | | |
|---|---|---|
| EP | 1160203 A1 | 12/2001 |
| JP | 3400942 B2 | 4/2003 |

OTHER PUBLICATIONS

Xiao, Shuhu, et al. "Degradation of biologically treated landfill leachate by using electrochemical process combined with UV irradiation." Separation and Purification Technology 117 (2013): 24-29.

Ye, Zhihong, et al. "Treatment of landfill leachate using electrochemically assisted UV/chlorine process: effect of operating conditions, molecular weight distribution and fluorescence EEM-PARAFAC analysis." Chemical Engineering Journal 286 (2016): 508-516.

Ren, Xu, et al. "Treatment of membrane concentrated leachate by two-stage electrochemical process enhanced by ultraviolet radiation: performance and mechanism." Separation and Purification Technology 259 (2021): 118032.

Zhao, Xu, et al. "Photoelectrochemical treatment of landfill leachate in a continuous flow reactor." Bioresource technology 101.3 (2010): 865-869.

\* cited by examiner

SYSTEM AND METHOD FOR PERFORMING ELECTROCHEMICALLY-CYCLED OXIDATION ON LANDFILL LEACHATE

CROSS-REFERENCE TO RELATED APPLICATIONS

This application claims the benefit of U.S. Provisional Patent Application No. 63/340,409, filed on May 10, 2022.

BACKGROUND OF THE INVENTION

Field of the Invention

The disclosure of the present patent application relates to the pre-treatment of landfill leachate for co-treatment through dilution with municipal sewage, and particularly to a multi-stage process including electrochemical oxidation and photolysis to remove organic materials in the landfill leachate which have an ultraviolet absorbance at 254 nm ($UVA_{254}$).

Description of Related Art

Leachate from landfills varies widely in composition, depending on both the age of the landfill and the type of waste that it contains. Landfill leachate is primarily created from precipitation percolating through waste deposited in the landfill. Once in contact with decomposing solid waste, the percolating water becomes contaminated, flowing out of the waste material as, primarily, a solution and suspension of various waste products. Additional leachate volume is produced during this decomposition of carbonaceous material, producing a wide range of other materials including methane, carbon dioxide and a complex mixture of organic acids, aldehydes, alcohols and simple sugars.

On-site treatment is commonly applied to landfill leachate prior to its discharge into the environment. Such on-site treatment is typically in the form of a multistage treatment process which is both complex and costly. A common alternative to on-site treatment is co-treatment through dilution of the landfill leachate with municipal sewage. As of 2019, approximately 18 million metric tons of landfill leachate had been co-treated into municipal sewage lines in the United States. In the North East New Territories landfill in Hong Kong, around 1,000 metric tons of landfill leachate is co-treated daily.

Although such co-treatment is far less costly than on-site treatment, co-treatment has been found to be detrimental to the downstream wastewater treatment plant. Landfill leachate contains dissolved organic matter (DOM) at high concentrations. The DOM, when discharged into municipal sewage lines, can absorb ultraviolet (UV) light during the UV disinfection stage at the downstream wastewater treatment plant. Since the DOM absorbs the UV light, the UV power output must be increased to have the same effect it would have on just the wastewater. This increases the overall costs of treatment, along with adding related costs, such as more frequent replacement of UV lamps. The absorption of the UV light by the DOM also increases risks to the general population due to the potential for incomplete or insufficient wastewater disinfection. Thus, in order to mitigate these problems inherent in co-treatment, ultraviolet absorbance at 254 nm must be reduced in the landfill leachate prior to its co-treatment with wastewater.

It has been found that approximately 90% of the materials in the landfill leachate which have an ultraviolet absorbance at 254 nm ($UVA_{254}$) derive from small recalcitrant molecules below 1 kDa, thus making conventional treatment methods, such as coagulation-sedimentation and biological treatment, ineffective in reducing the UVA254. For this reason, biological treatment has been found to only reduce between 20-30% of the UVA254. Furthermore, advanced filtration processes, such as nanofiltration and reverse osmosis, require high chemical consumption for membrane cleaning and fouling prevention, thus making them costly, both economically and in terms of time. These technologies also generate a secondary waste, referred to as leachate concentrate, which can contain up to 20 times the original leachate concentration with limited options for treatment. Leachate concentrate is also disposed via co-treatment with municipal wastewater, thus, regardless of treatment, the fate of landfill leachate is sewage co-treatment. Therefore, an economic practice to facilitate on-site leachate to sewage co-treatment is necessary.

Advanced oxidation processes (AOPs), such as Fenton oxidation and electrochemical oxidation, have been tested for treating landfill leachate. These processes destroy the organic matter in the leachate to reduce the $UVA_{254}$. However, Fenton oxidation requires expensive hydrogen peroxide dosing to be activated by a non-regenerative catalyst (e.g., iron). Electrochemical oxidation, on the other hand, generates the oxidant in situ through the conversion of chloride in the leachate. The generated product is primarily hypochlorite ($OCl^-$), hydroxyl radicals ($OH^\bullet$), and reactive chlorine species (RCS), which rapidly attack the organic bonds which bear UVA254. Between the three, the order of reactiveness is $OH^\bullet > RCS > OCl^-$, although $OH^\bullet$ and RCS require toxic or fragile electrode coatings for generation.

An alternative to the above electrochemical oxidation technique is to generate $OCl^-$ with affordable electrodes (e.g., mixed metal oxides) and apply UV radiation to photolyze the $OCl^-$ into $OH^\bullet$ and RCS. However, in testing, application of this alternative on landfill leachate required 2-8 hours of treatment, resulting in an energy expenditure of over 260 $kWh \cdot m^{-3}$. Electrochemical technologies have strong benefits, such as facile maintenance, no chemical addition, and flexible adjustments to match the desired degradation. Thus, a system and method for performing electrochemically-cycled oxidation on landfill leachate solving the aforementioned problems are desired.

SUMMARY OF THE INVENTION

The system for performing electrochemically-cycled oxidation on landfill leachate includes a housing divided into first and second reactor chambers. The housing has an inlet adapted for introducing a stream of landfill leachate to be treated into the first reactor chamber, and further has an outlet for releasing a stream of fully treated landfill leachate from the second reactor chamber. An anode and a cathode are received within the first reactor chamber and are connected to an electrical power supply, which may be a direct current (DC) power supply. The anode is made from a metal oxide, such as $IrO_2$, $RuO_2$ or $Ta_2O_5$, and the anode and cathode are used to perform electrochemical oxidation on the landfill leachate in the first reactor chamber to produce hypochlorite ($OCl^-$).

At least one first source of ultraviolet radiation is received within the first reactor chamber for applying first ultraviolet radiation to the landfill leachate and the hypochlorite (OCl—) following initiation of the electrochemical oxidation of the landfill leachate. The application of the first ultraviolet radiation to the hypochlorite ($OCl^-$) produces hydroxyl radicals (OH•) and reactive chlorine species (RCS). The hypochlorite (OCl⁻), the hydroxyl radicals (OH•) and the reactive chlorine species break bonds in organic materials in the landfill leachate which have an ultraviolet absorbance at 254 nm ($UVA_{254}$), resulting in a partially-treated landfill leachate.

The first ultraviolet radiation is applied to the landfill leachate and the hypochlorite (OCl⁻) beginning at a time between 5 and 20 minutes after the initiation of the electrochemical oxidation of the landfill leachate; i.e., application of the first ultraviolet radiation is delayed by 5 to 20 minutes following initiation of the electrochemical oxidation. The electrochemical oxidation is performed with an electrooxidation current density between 100 A/m² and 300 A/m², and the first ultraviolet radiation is applied to the landfill leachate and the hypochlorite (OCl⁻) with an ultraviolet (UV) fluence of between 5 mW/cm² and 40 mW/cm².

At least one second source of ultraviolet radiation is received within the second reactor chamber. A portion of the partially-treated landfill leachate flows into the second reactor chamber such that application of second ultraviolet radiation produced by the at least one second source of ultraviolet radiation thereon removes residual chlorine therefrom by photolysis to produce the fully treated landfill leachate. The at least one second source of ultraviolet radiation applies the second ultraviolet radiation with a UV fluence of between 5 mW/cm² and 40 mW/cm² for a period of 5 to 10 minutes. A one-way conduit may be provided for one-way transport of the partially-treated landfill leachate from the first reactor chamber to the second reactor chamber. The fully treated landfill leachate is extracted from the second reactor chamber through the outlet.

After the portion of the partially-treated landfill leachate flows into the second reactor chamber, fresh landfill leachate may be fed into the first reactor chamber. The fresh landfill leachate has a volume equal to the volume of the portion of the partially-treated landfill leachate in the second reactor chamber prior to the extraction thereof. Following the feeding of the fresh landfill leachate into the first reactor chamber, the method for performing electrochemically-cycled oxidation on landfill leachate may be reinitiated, allowing for continuous processing and treatment of a source of landfill leachate.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
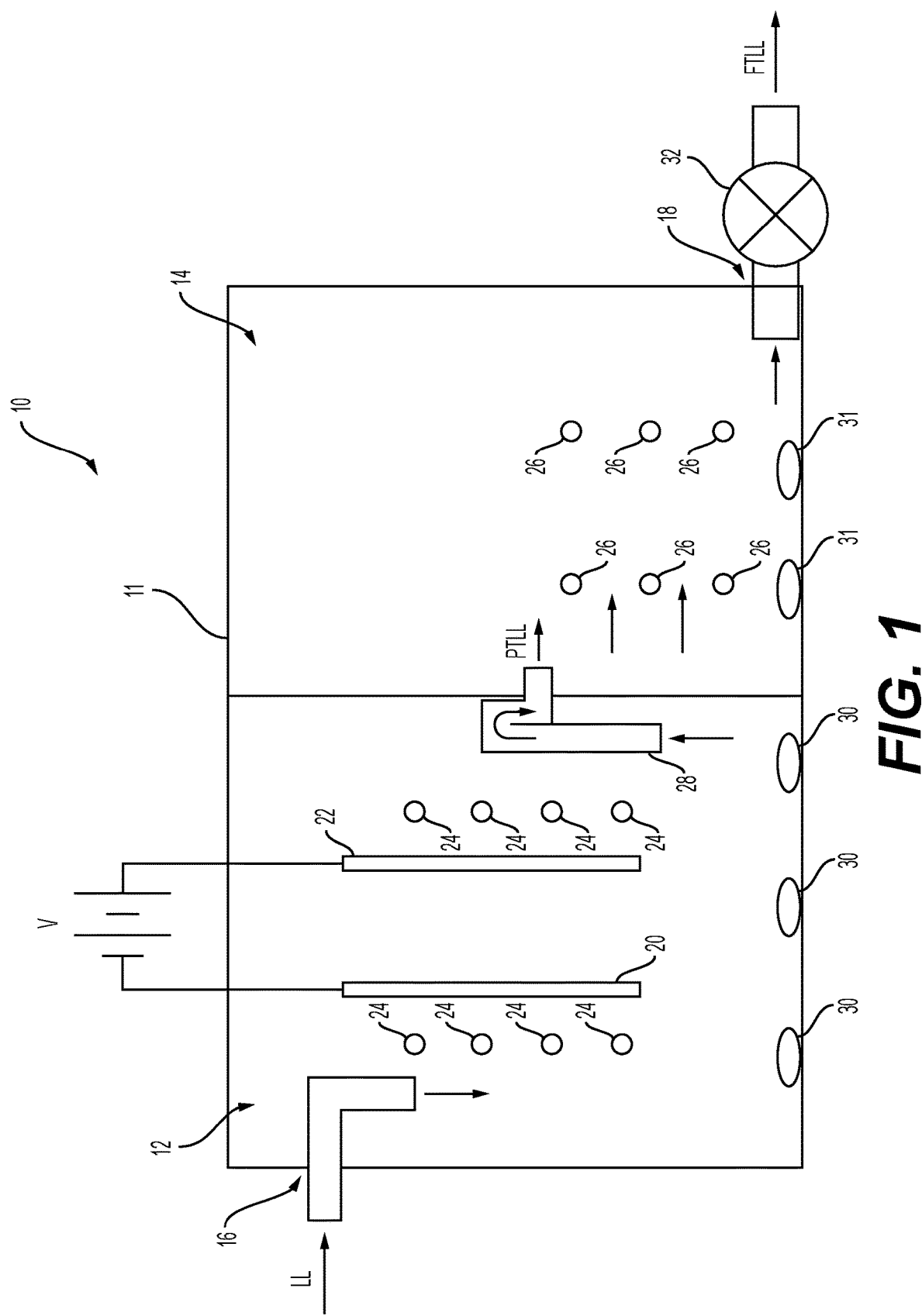
FIG. 1 schematically illustrates a system for performing electrochemically-cycled oxidation on landfill leachate.

As shown in FIG. 1, the system for performing electrochemically-cycled oxidation on landfill leachate 10 includes a housing 11 divided into first and second reactor chambers 12, 14, respectively. The housing 11 has an inlet 16 adapted for introducing a stream of landfill leachate (LL) to be treated into the first reactor chamber 12, and further has an outlet 18 for releasing a stream of fully treated landfill leachate (FTLL) from the second reactor chamber 14. A cathode 20 and an anode 22 are received within the first reactor chamber 12 and are connected to an electrical power supply (V), which may be a direct current (DC) power supply. The anode 22 is made from a metal oxide, such as $IrO_2$, $RuO_2$ or $Ta_2O_5$, and the anode 22 and the cathode 20 are used to perform electrochemical oxidation on the landfill leachate in the first reactor chamber 12 to produce hypochlorite (OCl⁻). The cathode 20 may be formed from any suitable electrode material for electrochemically oxidizing landfill leachate, such as titanium or the like.

As shown in FIG. 1, one or more magnetic stirrers 30 may be provided in the first reactor chamber 12 for continuously mixing and stirring the landfill leachate during processing thereof. It should, however, be understood that the one or more magnetic stirrers 30 are shown for exemplary purposes only, and that any suitable type of mixers, stirrers, agitators or the like may be used. As a non-limiting example, the one or more magnetic stirrers 30 may be replaced by, or augmented with, impellers appropriate for continuous mixing of large-scale systems.

Further, it should be understood that the overall configuration of the system for performing electrochemically-cycled oxidation on landfill leachate 10 is shown for exemplary purposes only, and that the positioning, relative dimensions and shape of the first and second reactor chambers 12, 14, respectively, may be varied. As a further non-limiting alternative, first and second reactor chambers 12, 14 may be spatially separated from one another, either within the same overall housing 11 or located within individual separate housings or units. In such an alternative configuration, it should be understood that any suitable type of conduits or other hardware or mechanisms may be provided to transfer the treated leachate in first reactor chamber 12 to the second reactor chamber 14 upon sufficient treatment thereof.

At least one first source of ultraviolet radiation 24 is received within the first reactor chamber 12 for applying first ultraviolet radiation to the landfill leachate and the hypochlorite (OCl⁻) following initiation of the electrochemical oxidation of the landfill leachate. In FIG. 1, eight ultraviolet bulbs 24 are illustrated, however, it should be understood that this is for purposes of illustration only, and that any suitable type and any suitable number of ultraviolet radiation sources may be used.

The application of the first ultraviolet radiation to the hypochlorite (OCl⁻) produces hydroxyl radicals (OH•) and reactive chlorine species (RCS). The hypochlorite (OCl⁻), the hydroxyl radicals (OH•) and the reactive chlorine species break bonds in organic materials in the landfill leachate which have an ultraviolet absorbance at 254 nm ($UVA_{254}$), resulting in a partially-treated landfill leachate (PTLL).

The first ultraviolet radiation is applied to the landfill leachate and the hypochlorite (OCl⁻) beginning at a time between 5 and 20 minutes after the initiation of the electrochemical oxidation of the landfill leachate; i.e., application of the first ultraviolet radiation is delayed by 5 to 20 minutes following initiation of the electrochemical oxidation. The electrochemical oxidation is performed with an electrooxidation current density between 100 A/m² and 300 A/m², and the first ultraviolet radiation is applied to the landfill leachate and the hypochlorite (OCl⁻) with an ultraviolet (UV) fluence of between 5 mW/cm² and 40 mW/cm². The combination of electrochemical oxidation and application of the first ultraviolet radiation is performed for approximately 60 minutes, which reduces the $UVA_{254}$ content of the landfill leachate by approximately 80%.

At least one second source of ultraviolet radiation 26 is received within the second reactor chamber 14. In FIG. 1, six ultraviolet bulbs 26 are illustrated, however, it should be understood that this is for purposes of illustration only, and that any suitable type and any suitable number of ultraviolet radiation sources may be used. A portion of the partially-treated landfill leachate flows into the second reactor chamber 14 such that application of second ultraviolet radiation produced by the at least one second source of ultraviolet radiation 26 thereon removes residual chlorine therefrom by photolysis to produce the fully treated landfill leachate. Between 5% and 50% (by volume) of the partially-treated landfill leachate from the first reactor chamber 12 is transported into the second reactor chamber 14 for subsequent dechlorination. An equivalent volume of fresh landfill leachate is fed into the first reactor chamber 12 through inlet 16. A one-way conduit 28 may be provided for one-way transport of the partially-treated landfill leachate from the first reactor chamber 12 to the second reactor chamber 14. As shown in FIG. 1, one or more magnetic stirrers 31 may be provided in the second reactor chamber 14 for continuously mixing and stirring the landfill leachate during processing thereof. The fully treated landfill leachate is extracted from the second reactor chamber 14 through the outlet 18. As shown, release of the fully treated landfill leachate may be controlled by a timer valve 32 or the like.

Photolysis within the second reactor chamber further reduces the $UVA_{254}$ content of the partially-treated landfill leachate by 15-20%. The at least one second source of ultraviolet radiation 26 applies the second ultraviolet radiation with a UV fluence of between 5 mW/cm² and 40 mW/cm² for a period of 5 to 10 minutes. Continuous operation of the system for performing electrochemically-cycled oxidation on landfill leachate 10 with the above parameters results in a treatment process with an energy requirement of less than 20 kWh/m³.

After the portion of the partially-treated landfill leachate flows into the second reactor chamber 14, as noted above, fresh landfill leachate may be fed into the first reactor chamber 12. The fresh landfill leachate has a volume equal to the volume of the portion of the partially-treated landfill leachate in the second reactor chamber prior to the extraction thereof. Thus, following the feeding of the fresh landfill leachate into the first reactor chamber 12, where it mixes with the partially-treated landfill leachate already contained therein, the method for performing electrochemically-cycled oxidation on landfill leachate may be reinitiated. Whereas the initial phase of treatment in the first reactor chamber 12 is run for approximately 60 minutes, the recycled phase in the first reactor chamber 12 (i.e., where the fresh landfill leachate is mixed with the remaining partially-treated landfill leachate) is only run for 10 to 15 minutes, reducing the chlorine contact time to reduce toxic by-products in the leachate.

Figure 2:
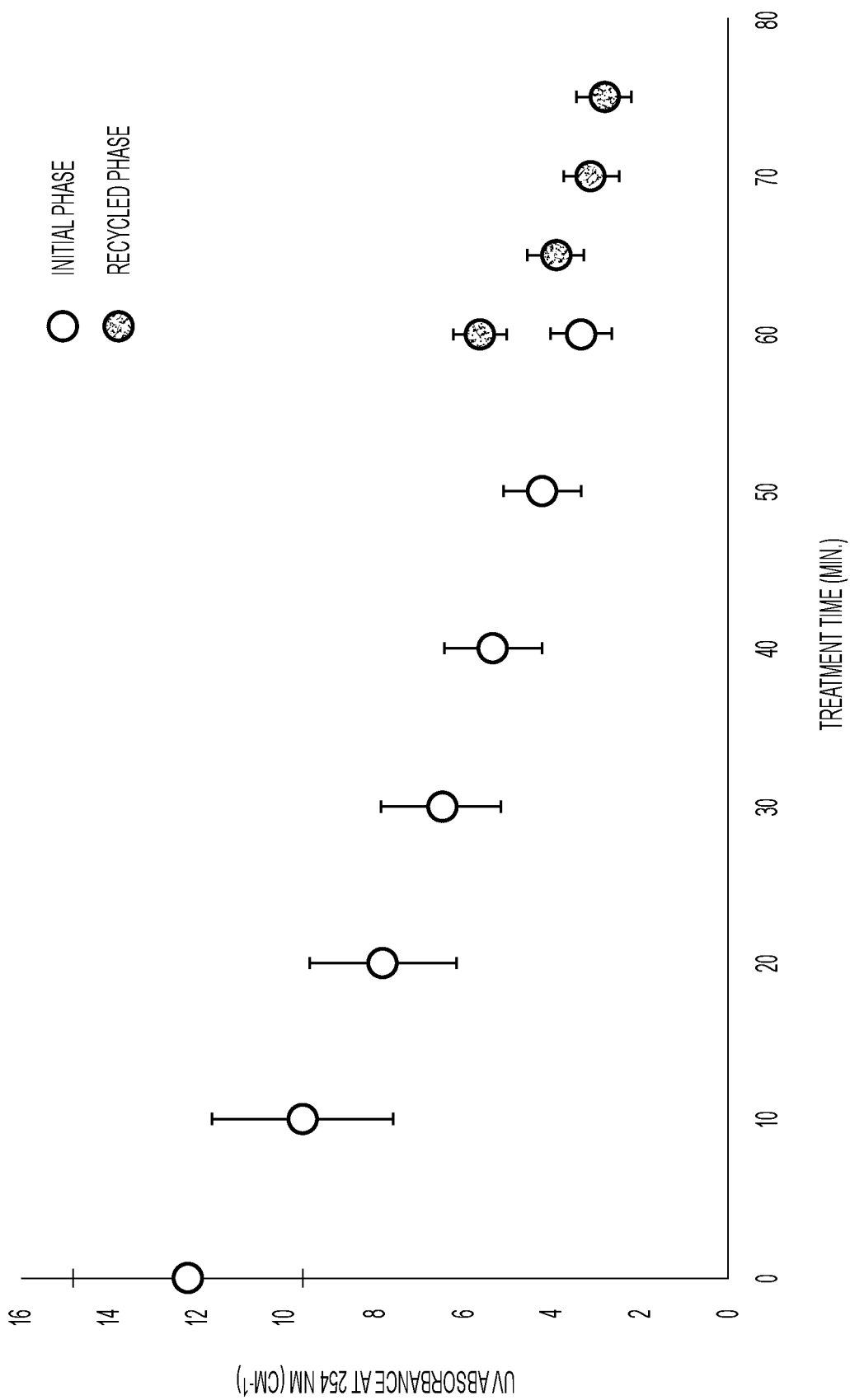
FIG. 2 is a plot showing UV absorbance at 254 nm in landfill leachate as a function of time during both an initial phase and a recycled phase of the method for performing electrochemically-cycled oxidation on landfill leachate using the system of FIG. 1.

FIG. 2 is a plot showing UV absorbance at 254 nm in landfill leachate as a function of time during both the initial phase and the recycled phase. As shown, in the initial phase, the amount of $UVA_{254}$ ranges from 9 cm⁻¹ to 15 cm⁻¹, and over the course of 60 minutes of treatment in the initial phase, the amount of $UVA_{254}$ is decreased by approximately 80%. Since the recycled phase is performed in the first reactor chamber 12 using a mixture of fresh landfill leachate and the remaining partially-treated landfill leachate, as expected, the amount of $UVA_{254}$ is greater at the start than the amount of $UVA_{254}$ at the end of the initial phase, but it rapidly decreases in a limited time period of about 15 minutes.

Figure 3:
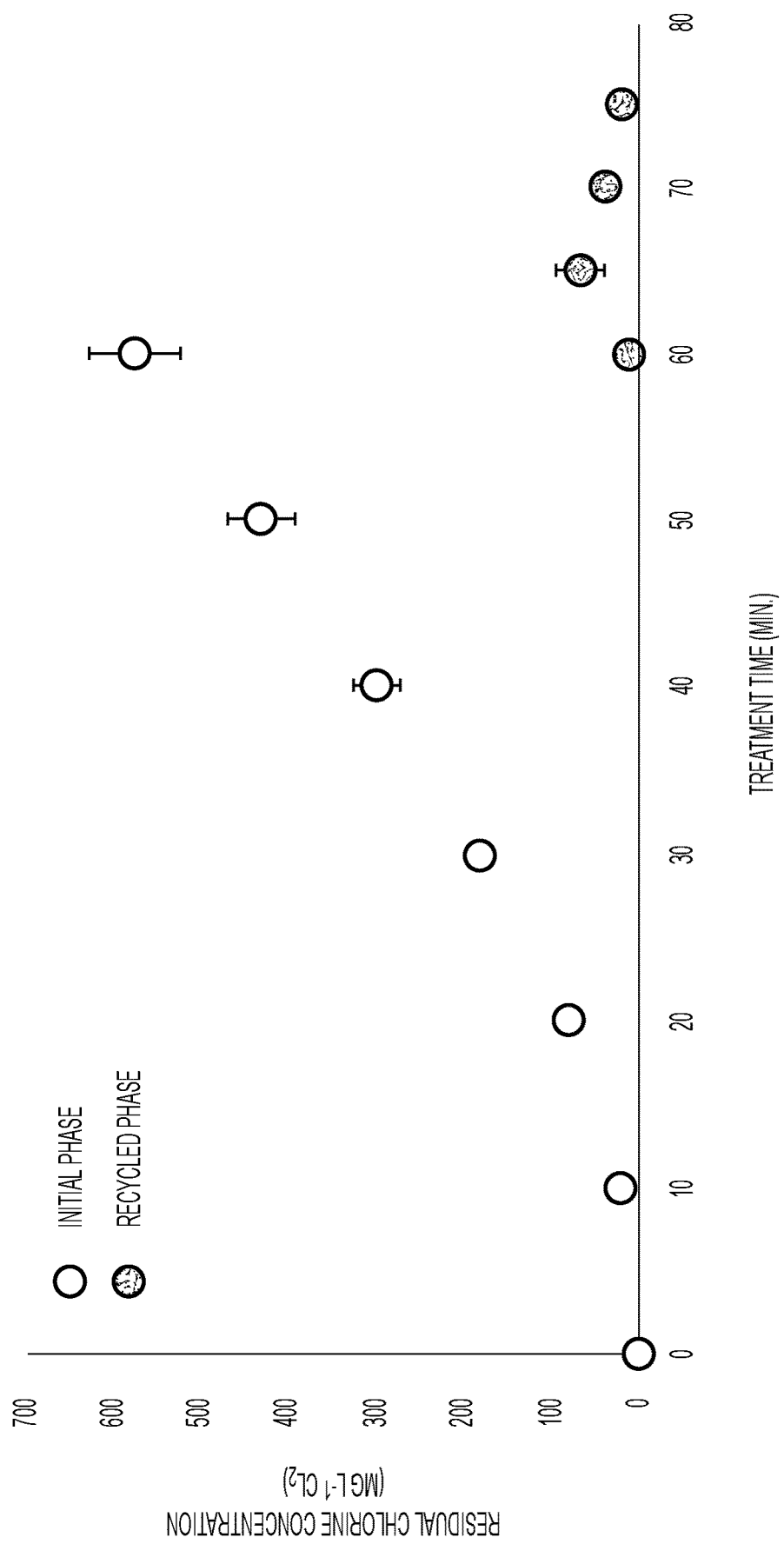
FIG. 3 is a plot showing residual chlorine concentration as a function of time in the initial phase and the recycled phase of FIG. 2.

FIG. 3 is a plot showing residual chlorine concentration as a function of time in the initial phase and the recycled phase. Due to the intentional production of hypochlorite ($OCl^-$), hydroxyl radicals ($OH^\bullet$) and reactive chlorine species, as discussed above, as expected, the residual chlorine concentration in the initial phase (within the first reactor chamber 12) begins at zero and steadily increases throughout the entire 60 min. cycle. The second reactor chamber 14 relieves the residual chlorine to below 25 mg/L as $Cl_2$ after each continuous cycle. At 3.5% v/v sewage co-treatment, as practiced in Hong Kong, the residual chlorine which enters the sewage line is below 1 mg/L as $Cl_2$.

Figure 4:
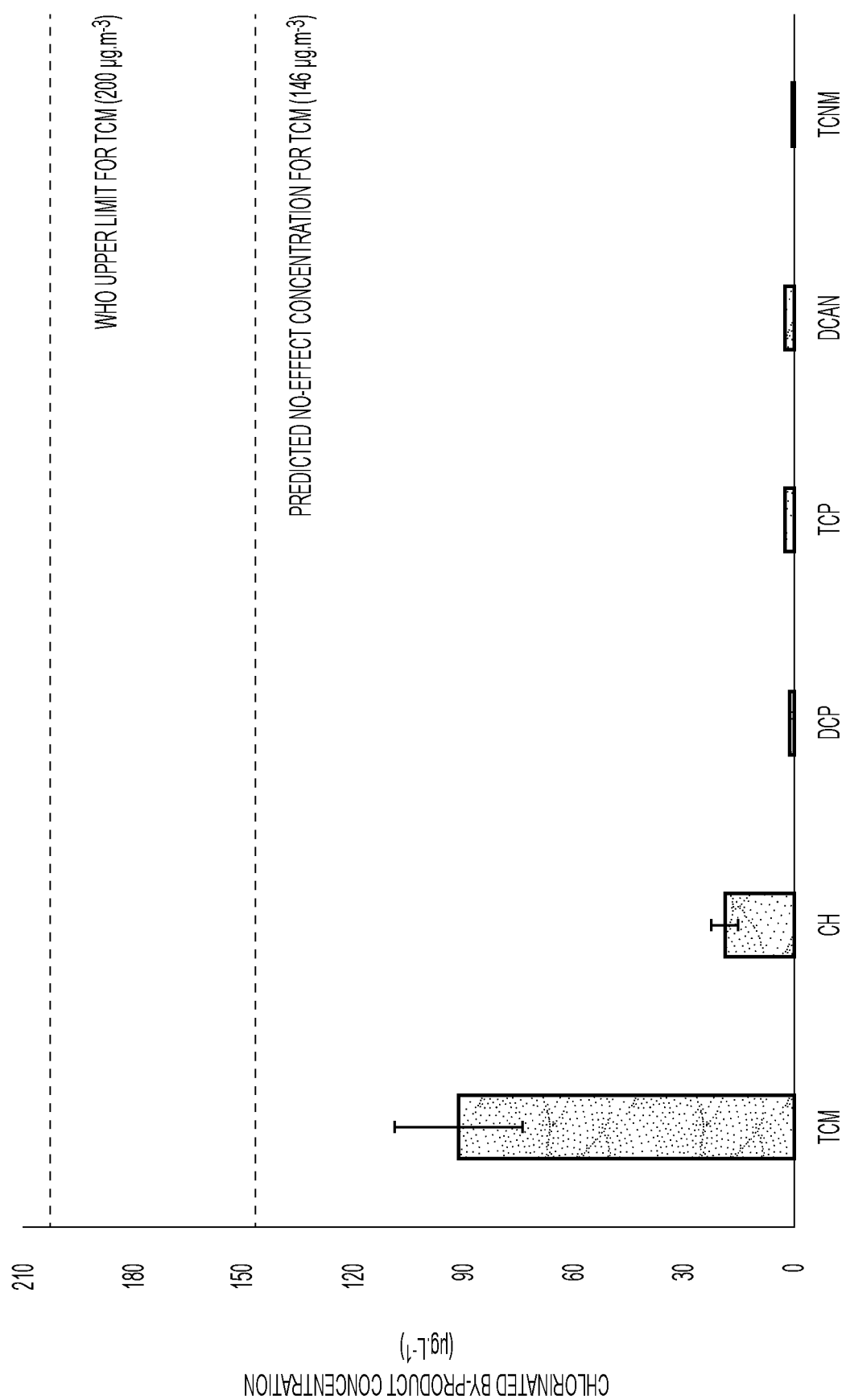
FIG. 4 is a graph showing the concentrations of chlorinated by-products released following the method for performing electrochemically-cycled oxidation on landfill leachate.

FIG. 4 is a graph showing the concentrations of chlorinated by-products released following the method for performing electrochemically-cycled oxidation on landfill leachate, particularly showing the concentrations of trichloromethane (TCM), chloral hydrate (CH), dichloropropanone (DCP), trichloropropanone, (TCP), dichloroacetonitrile (DCAN), and trichloronitromethane (TCNM) after treatment and 3.5% v/v dilution into sewage co-treatment. The World Health Organization (WHO) upper limit for TCM is 200 μg/m³ and the predicted no-effect concentration (PNEC) is 146 μg/m³. As shown, the method for performing electrochemically-cycled oxidation on landfill leachate yields a TCM concentration far below either value, clearly indicating that the method for performing electrochemically-cycled oxidation on landfill leachate is safe for use.

It is to be understood that the system and method for performing electrochemically-cycled oxidation on landfill leachate are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for performing electrochemically-cycled oxidation on landfill leachate, comprising:

a housing divided into first and second reactor chambers, the housing having an inlet adapted for introducing a stream of landfill leachate to be treated into the first reactor chamber, and the housing further having an outlet for releasing a stream of fully treated landfill leachate from the second reactor chamber;

an anode and a cathode received within the first reactor chamber, wherein the anode comprises a metal oxide;

an electrical power supply connected to the anode and the cathode, wherein electrochemical oxidation is performed on the landfill leachate in the first reactor chamber to produce hypochlorite ($OCl^-$);

at least one first source of ultraviolet radiation received within the first reactor chamber, wherein the at least one source of ultraviolet radiation applies first ultraviolet radiation to the landfill leachate and the hypochlorite ($OCl^-$) following initiation of the electrochemical oxidation of the landfill leachate, wherein the application of the first ultraviolet radiation to the hypochlorite ($OCl^-$) produces hydroxyl radicals ($OH^\bullet$) and reactive chlorine species, the hypochlorite ($OCl^-$), the hydroxyl radicals ($OH^\bullet$) and the reactive chlorine species breaking bonds in organic materials in the landfill leachate which have an ultraviolet absorbance at 254 nm, resulting in a partially-treated landfill leachate; and at least one second source of ultraviolet radiation received within the second reactor chamber, a portion of the partially-treated landfill leachate flowing into the second reactor chamber such that application of second ultraviolet radiation produced by the at least one second source of ultraviolet radiation thereon removes residual chlorine therefrom by photolysis to produce the fully treated landfill leachate, the fully treated landfill leachate being extracted from the second reactor chamber through the outlet.

2. The system for performing electrochemically-cycled oxidation on landfill leachate as recited in claim 1, wherein the electrical power supply comprises a DC power supply.

3. The system for performing electrochemically-cycled oxidation on landfill leachate as recited in claim 1, wherein the metal oxide of the anode is selected from the group consisting of $IrO_2$, $RuO_2$ and $Ta_2O_5$.

4. The system for performing electrochemically-cycled oxidation on landfill leachate as recited in claim 1, wherein the first ultraviolet radiation is applied to the landfill leachate and the hypochlorite ($OCl^-$) beginning at a time between 5 and 20 minutes after the initiation of the electrochemical oxidation of the landfill leachate.

5. The system and method for performing electrochemically-cycled oxidation on landfill leachate as recited in claim 1, further comprising a one-way conduit for passing the partially-treated landfill leachate from the first reactor chamber to the second reactor chamber.

6. The system for performing electrochemically-cycled oxidation on landfill leachate as recited in claim 1, wherein the electrochemical oxidation is performed with an electrooxidation current density between 100 $A/m^2$ and 300 $A/m^2$.

7. The system for performing electrochemically-cycled oxidation on landfill leachate as recited in claim 6, wherein the first ultraviolet radiation is applied to the landfill leachate and the hypochlorite ($OCl^-$) with an ultraviolet fluence of between 5 $mW/cm^2$ and 40 $mW/cm^2$.

8. The system for performing electrochemically-cycled oxidation on landfill leachate as recited in claim 7, wherein the at least one second source of ultraviolet radiation applies the second ultraviolet radiation with an ultraviolet fluence of between 5 $mW/cm^2$ and 40 $mW/cm^2$.

9. A method for performing electrochemically-cycled oxidation on landfill leachate, comprising the steps of:
performing electrochemical oxidation on landfill leachate in a first reactor chamber to produce hypochlorite ($OCl^-$);
applying first ultraviolet radiation to the landfill leachate and the hypochlorite ($OCl^-$) following initiation of the electrochemical oxidation of the landfill leachate, wherein the application of the first ultraviolet radiation to the hypochlorite ($OCl^-$) produces hydroxyl radicals ($OH^\bullet$) and reactive chlorine species, the hypochlorite ($OCl^-$), the hydroxyl radicals ($OH^\bullet$) and the reactive chlorine species breaking bonds in organic materials in the landfill leachate which have an ultraviolet absorbance at 254 nm, resulting in a partially-treated landfill leachate;
applying second ultraviolet radiation to a portion of the partially-treated landfill leachate in a second reactor chamber to remove residual chlorine therefrom by photolysis to produce a fully treated landfill leachate; and extracting fully treated landfill leachate from the second reactor chamber.

10. The method for performing electrochemically-cycled oxidation on landfill leachate as recited in claim 9, further comprising the step of feeding fresh landfill leachate into the first reactor chamber, the fresh landfill leachate having a volume equal to a volume of the portion of the partially-treated landfill leachate in the second reactor chamber prior to the extraction thereof from the second reactor chamber.

11. The method for performing electrochemically-cycled oxidation on landfill leachate as recited in claim 10, wherein, following the step of feeding the fresh landfill leachate into the first reactor chamber, the method for performing electrochemically-cycled oxidation on landfill leachate is reinitiated.

12. The method for performing electrochemically-cycled oxidation on landfill leachate as recited in claim 9, wherein the step of applying the first ultraviolet radiation to the landfill leachate and the hypochlorite ($OCl^-$) begins at a time between 5 and 20 minutes after initiation of the electrochemical oxidation of the landfill leachate.

13. The method for performing electrochemically-cycled oxidation on landfill leachate as recited in claim 9, wherein the step of performing the electrochemical oxidation is performed with an electrooxidation current density between 100 $A/m^2$ and 300 $A/m^2$.

14. The method for performing electrochemically-cycled oxidation on landfill leachate as recited in claim 13, wherein the first ultraviolet radiation is applied to the landfill leachate and the hypochlorite ($OCl^-$) with an ultraviolet fluence of between 5 $mW/cm^2$ and 40 $mW/cm^2$.

15. The method for performing electrochemically-cycled oxidation on landfill leachate as recited in claim 14, wherein the second ultraviolet radiation is applied to the partially-treated landfill leachate with an ultraviolet fluence of between 5 $mW/cm^2$ and 40 $mW/cm^2$.

16. A system for performing electrochemically-cycled oxidation on landfill leachate, comprising:
a housing divided into first and second reactor chambers, the housing having an inlet adapted for introducing a stream of landfill leachate to be treated into the first reactor chamber, and the housing further having an outlet for releasing a stream of fully treated landfill leachate from the second reactor chamber;
an anode and a cathode received within the first reactor chamber, wherein the anode comprises a metal oxide;
an electrical power supply connected to the anode and the cathode, wherein electrochemical oxidation is performed on the landfill leachate in the first reactor chamber to produce hypochlorite ($OCl^-$);
at least one first source of ultraviolet radiation received within the first reactor chamber, wherein the at least one source of ultraviolet radiation applies first ultraviolet radiation to the landfill leachate and the hypochlorite ($OCl^-$) following initiation of the electrochemical oxidation of the landfill leachate, wherein the application of the first ultraviolet radiation to the hypochlorite ($OCl^-$) produces hydroxyl radicals ($OH^\bullet$) and reactive chlorine species, the hypochlorite ($OCl^-$), the hydroxyl radicals ($OH^\bullet$) and the reactive chlorine species breaking bonds in organic materials in the landfill leachate which have an ultraviolet absorbance at 254 nm, resulting in a partially-treated landfill leachate;
a one-way conduit for passing a portion of the partially-treated landfill leachate from the first reactor chamber to the second reactor chamber; and at least one second source of ultraviolet radiation received within the second reactor chamber, such that application of second ultraviolet radiation produced by the at least one second source of ultraviolet radiation on the portion of the partially-treated landfill leachate in the second reactor chamber removes residual chlorine therefrom by photolysis to produce the fully treated landfill leachate, the fully treated landfill leachate being extracted from the second reactor chamber through the outlet.

17. The system for performing electrochemically-cycled oxidation on landfill leachate as recited in claim 16, wherein the metal oxide of the anode is selected from the group consisting of $IrO_2$, $RuO_2$ and $Ta_2O_5$.

18. The system for performing electrochemically-cycled oxidation on landfill leachate as recited in claim 16, wherein the first ultraviolet radiation is applied to the landfill leachate and the hypochlorite ($OCl^-$) beginning at a time between 5 and 20 minutes after the initiation of the electrochemical oxidation of the landfill leachate.

19. The system and method for performing electrochemically-cycled oxidation on landfill leachate as recited in claim 16, wherein the electrochemical oxidation is performed with an electrooxidation current density between 100 $A/m^2$ and 300 $A/m^2$.

20. The system for performing electrochemically-cycled oxidation on landfill leachate as recited in claim 19, wherein the first ultraviolet radiation is applied to the landfill leachate and the hypochlorite ($OCl^-$) with an ultraviolet fluence of between 5 $mW/cm^2$ and 40 $mW/cm^2$, and wherein the at least one second source of ultraviolet radiation applies the second ultraviolet radiation with an ultraviolet fluence of between 5 $mW/cm^2$ and 40 $mW/cm^2$.

* * * * *